(12) United States Patent
Roland

(10) Patent No.: US 10,156,913 B2
(45) Date of Patent: Dec. 18, 2018

(54) MICE

(71) Applicant: RAZER (ASIA-PACIFIC) PTE. LTD., Singapore (SG)

(72) Inventor: Yusuf Ali Roland, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 15/512,898

(22) PCT Filed: Sep. 24, 2014

(86) PCT No.: PCT/SG2014/000452
§ 371 (c)(1),
(2) Date: Mar. 21, 2017

(87) PCT Pub. No.: WO2016/048232
PCT Pub. Date: Mar. 31, 2016

(65) Prior Publication Data
US 2017/0249025 A1    Aug. 31, 2017

(51) Int. Cl.
*G06F 3/0354* (2013.01)
(52) U.S. Cl.
CPC ...... *G06F 3/03543* (2013.01); *G06F 3/03548* (2013.01); *G06F 2203/0332* (2013.01); *G06F 2203/0333* (2013.01)
(58) Field of Classification Search
CPC ............. G06F 3/03543; G06F 3/03548; G06F 2203/0333
See application file for complete search history.

(56) References Cited

U.S. PATENT DOCUMENTS

| 6,211,861 B1* | 4/2001 | Rosenberg ............. A63F 13/06 345/163 |
| 6,396,478 B1* | 5/2002 | Kravtin ............... G06F 3/03543 248/118.1 |
| 7,385,587 B1 | 6/2008 | Adapathya et al. |
| 2006/0227109 A1 | 10/2006 | Lo |
| 2009/0213068 A1 | 8/2009 | Saez et al. |
| 2014/0210718 A1 | 7/2014 | Wang |

FOREIGN PATENT DOCUMENTS

| WO | WO2006046815 | * | 4/2006 | ............ G06F 3/033 |
| WO | 2006/046815 A1 | | 5/2006 | |

OTHER PUBLICATIONS

Extended European Search Report dated Mar. 23, 2018, 9 pages, for the corresponding European Patent Application No. 14902621.3.

* cited by examiner

*Primary Examiner* — Andrew Sasinowski
(74) *Attorney, Agent, or Firm* — Polsinelli PC

(57) ABSTRACT

According to various embodiments, a mouse may be provided. The mouse may include: a housing including a plurality of panels; a moveable member coupled to the plurality of panels such that a movement of the moveable member causes a movement of each panel of the plurality of panels.

19 Claims, 5 Drawing Sheets

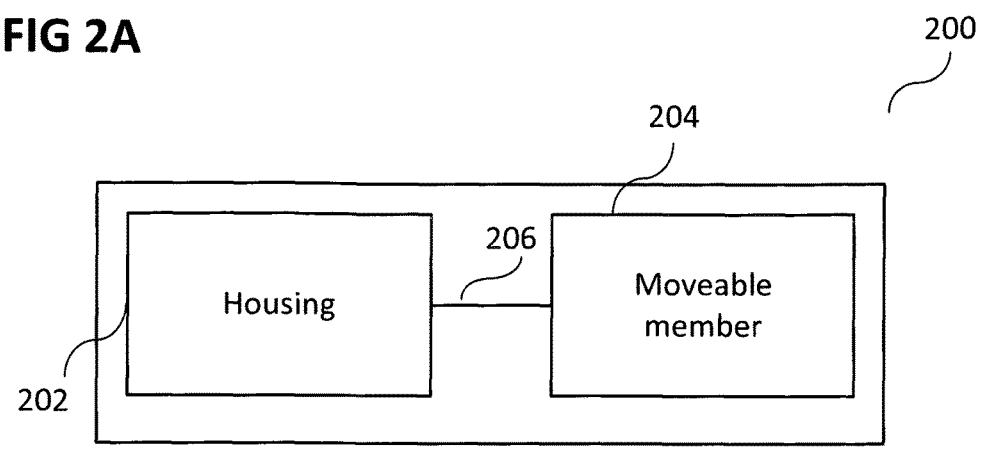
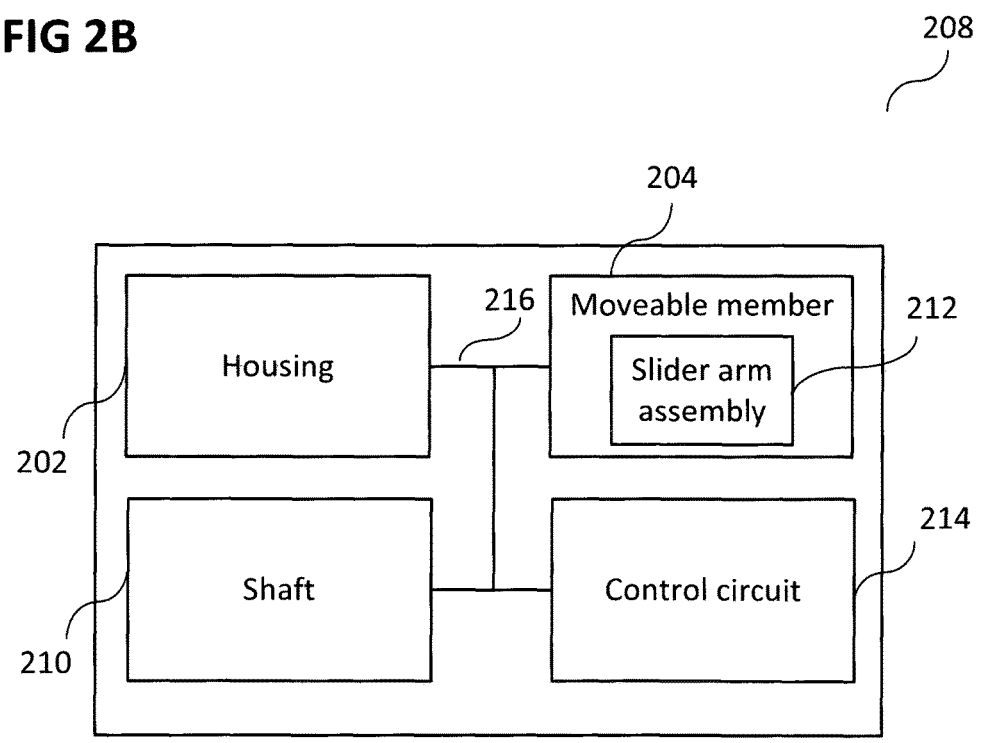

MICE

TECHNICAL FIELD

Various embodiments generally relate to mice (in other words: computer mice).

BACKGROUND

A mouse is a widely used input device for computer systems. As a mouse is actuated by a user's hand, the size of the mouse has large impact on a user experience. Thus, there may be a need for mice which may be used by various users with different hand sizes.

SUMMARY OF THE INVENTION

According to various embodiments, a mouse may be provided. The mouse may include: a housing including a plurality of panels; a moveable member coupled to the plurality of panels such that a movement of the moveable member causes a movement of each panel of the plurality of panels.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 2A shows a mouse according to various embodiments;

FIG. 2B shows a mouse according to various embodiments;

DETAILED DESCRIPTION

Figure 1:
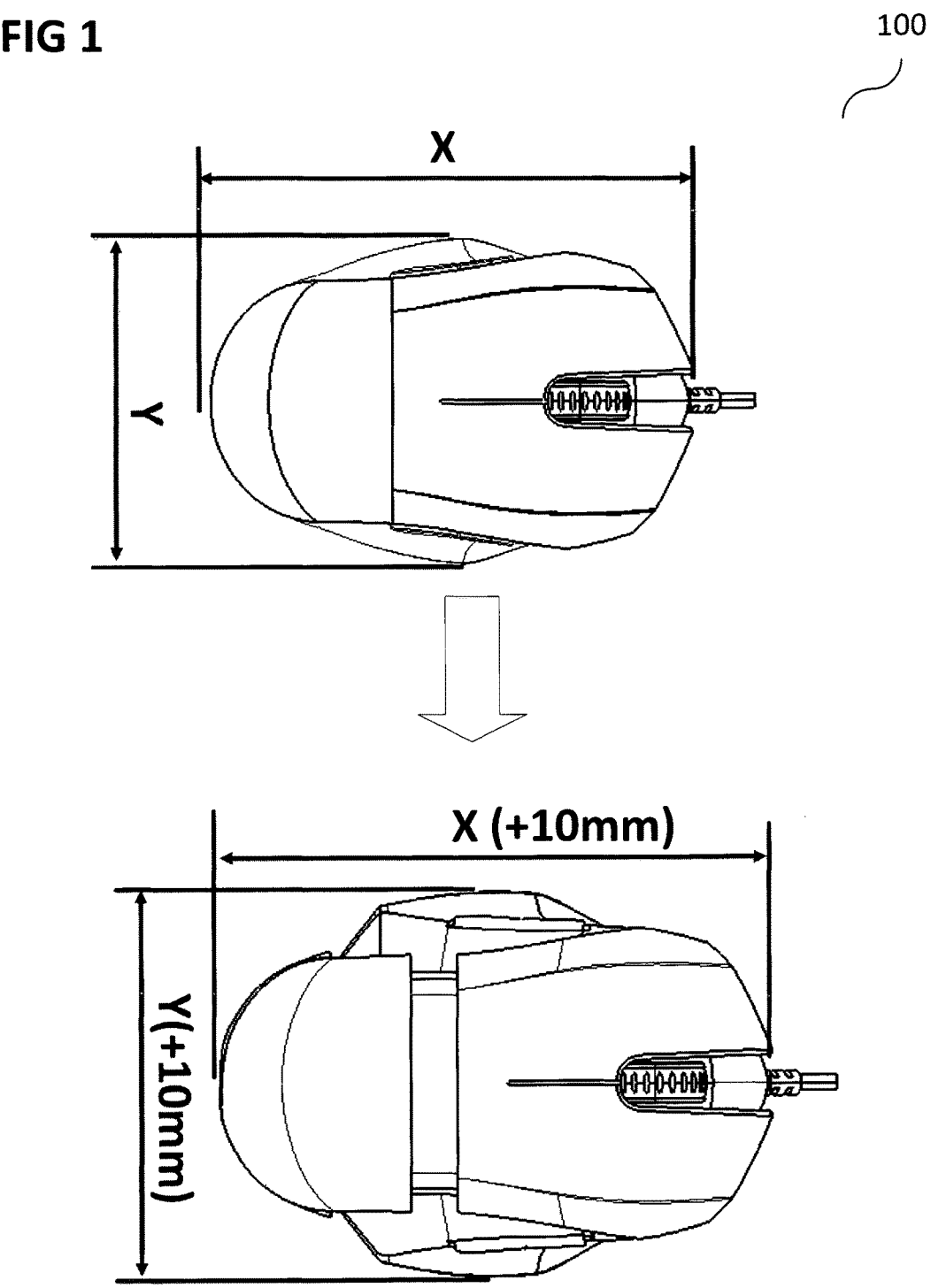
FIG. 1 shows an illustration of a mouse according to various embodiments at its large form factor and at its small form factor.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the mouse as described in this description may include a memory which is for example used in the processing carried out in the mouse. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

A mouse is a widely used input device for computer systems. As a mouse is actuated by a user's hand, the size of the mouse has large impact on a user experience. According to various embodiments, a mouse may be provided which may be used by various users with different hand sizes.

According to various embodiments, a single action mouse enlargement may be provided. According to various embodiments, a fully enlargement mouse (both side panel and back panel) may be provided where it is only necessary to do a single action to enlarge the 3 mentioned panels. A mouse according to various embodiments may provide a variety of sizes on a single unit. A mouse according to various embodiments may provide easy enlargement action for size adjustment. A mouse according to various embodiments may be suitable as a laptop mouse (at its small form factor) and as a desktop mouse (at its large form factor). A mouse according to various embodiments may provide cost savings (for example from a packaging point of view) because it will be shipped at its small form factor.

FIG. 1 shows an illustration 100 of a mouse (in other words: a computer mouse) according to various embodiments at its small form factor (top portion of FIG. 1) and at its big form factor (bottom portion of FIG. 1). It is to be noted that the mouse shape and size are for illustration only.

FIG. 2A shows a mouse (in other words: a computer mouse) 200 according to various embodiments. The mouse 200 may include a housing 202. The housing 202 may include (or may have) a plurality of panels (for example a left panel, a right panel, and a back panel; the plurality of panels may for example may be movable attached to a main portion of the housing). The mouse 200 may further include a moveable member 204. The moveable member 204 may be coupled to the plurality of panels such that a movement of the moveable member 204 causes a movement of each panel of the plurality of panels (for example relative to the main portion of the housing 202). The housing 202 and the moveable member 204 may be coupled with each other, for example mechanically coupled, or electrically coupled, like indicated by line 206.

In other words, a (computer) mouse may be provided, in which a moveable member is provided, so that moving the moveable member causes a movement of portions of the housing of the mouse.

FIG. 2B shows a mouse (in other words: a computer mouse) 200 according to various embodiments. The mouse 208 may, similar to the mouse 200 of FIG. 2A, include a housing 202. The housing 202 may include (or may have) a plurality of panels (which for example may be movable attached to a main portion of the housing 202). The mouse 208 may, similar to the mouse 200 of FIG. 2A, further include moveable member 204 coupled to the plurality of panels such that a movement of the moveable member causes a movement of each panel of the plurality of panels. The mouse may further include a shaft 210 fixedly attached to the housing 200 (for example to a portion of the housing, for example to the main portion of the housing, but not to any one of the plurality of panels). The moveable member 204 may include a slider arm assembly 212. The slider arm assembly 212 may include a central portion. The central portion may be slidably attached to the shaft 210. The slider arm assembly 212 may be coupled to the plurality of panels such that a movement of the slider arm assembly 212 along the shaft 210 causes the movement of each panel of the plurality of panels (for example relative to the main portion of the housing 202). The mouse 208 may further include a control circuit 214, like will be described in more detail below. The housing 202, the moveable member 204, the shaft 210, and the control circuit 214 may be coupled with each other, for example mechanically coupled, or electrically coupled, like indicated by lines 216.

According to various embodiments, the movement of each panel of the plurality of panels may include or may be a simultaneous movement (in other words: a movement at the same time) of the plurality of panels.

According to various embodiments, the movement of each panel of the plurality of panels may include or may be a movement of the plurality of panels such that a width of the mouse and a length of the mouse 208 are increased.

According to various embodiments, the movement of each panel of the plurality of panels may include or may be a movement of the plurality of panels such that the width of the mouse 208 and the length of the mouse 208 are increased by the same absolute amount.

According to various embodiments, the movement of each panel of the plurality of panels may include or may be a movement of the plurality of panels such that the width of the mouse 208 and the length of the mouse 208 are increased by the same relative amount.

According to various embodiments, the plurality of panels may include a back panel. According to various embodiments, the central portion may engage with the back panel.

According to various embodiments, the plurality of panels may include a left panel. According to various embodiments, the slider arm assembly 212 may include a left portion. The left portion may be pivotally connected to the central portion and connected to the left panel.

According to various embodiments, the plurality of panels may include a right panel. According to various embodiments, the slider arm assembly 212 may include a right portion. The right portion may be pivotally connected to the central portion and connected to the right panel.

According to various embodiments, each panel of the plurality of panels may be connected to a main portion of the housing 202 using a respective spring.

According to various embodiments, the respective springs may provide a counter force to forces exerted to the panels by the slider arm assembly 212.

According to various embodiments, the slider arm assembly 212 may further include an actuation member configured to move the slider arm assembly 212 along the shaft 210.

According to various embodiments, the actuation member may be configured to be manually operated.

According to various embodiments, the actuation member may protrude through the housing 202.

According to various embodiments, the actuation member may include (or may be) an electrical actuator configured to move the slider arm assembly 212 along the shaft 210.

According to various embodiments, the electrical actuator may include or may be a motor, and/or a servo motor, and/or a piezo actuator, and/or an electromagnetic actuator, and/or an electro-hydraulic actuator, and/or an electro-pneumatic actuator.

According to various embodiments, the control circuit 214 may be configured to control the electrical actuator.

According to various embodiments, the control circuit 214 may be configured to control the electrical actuator based on an input from a host computer.

According to various embodiments, the control circuit 214 may be configured to control the electrical actuator based on a user input to the mouse 208.

According to various embodiments, the control circuit 214 may be configured to control the electrical actuator to move the slider arm assembly 212 to a pre-determined position when the mouse 208 is powered off.

Figure 3:
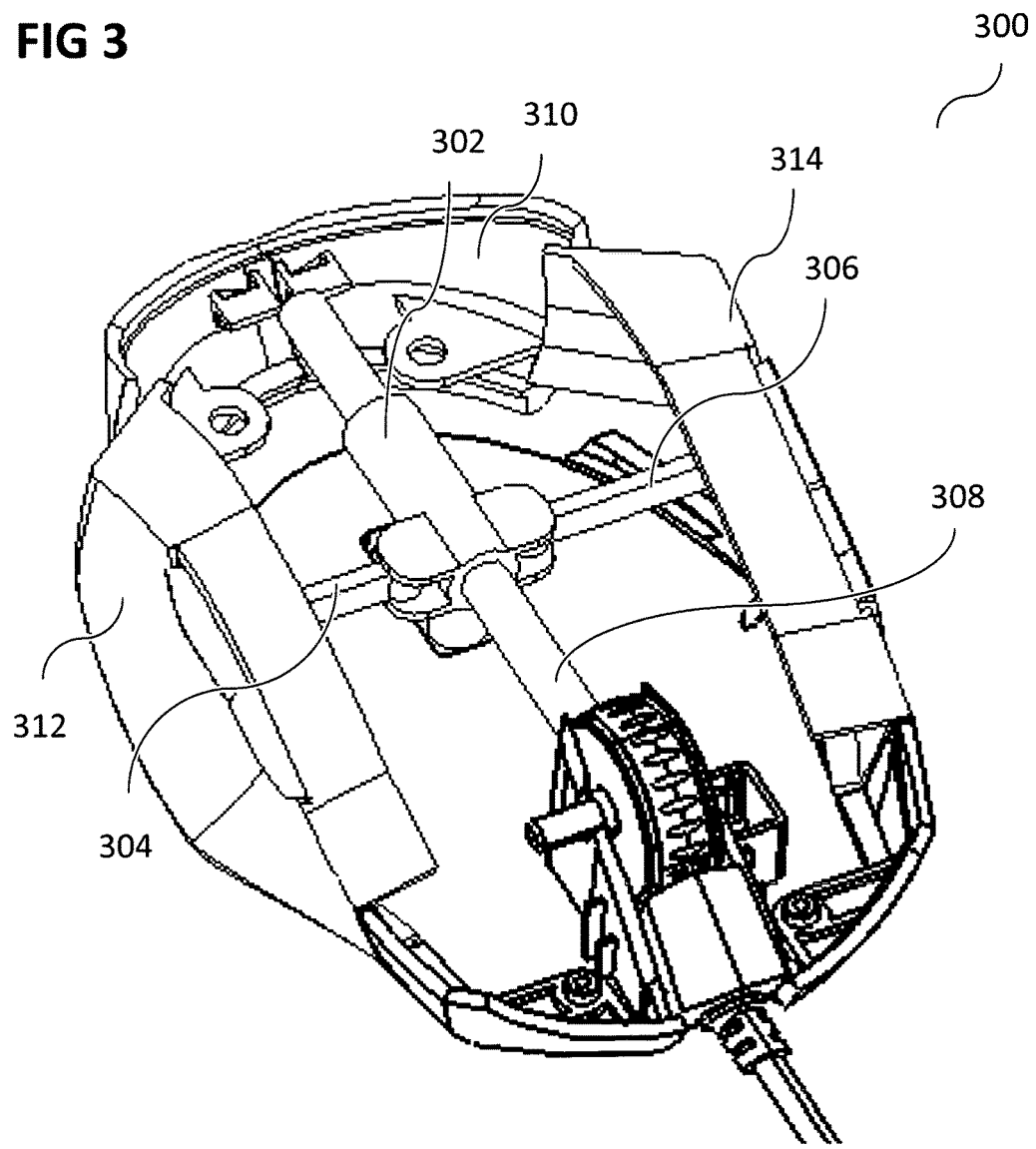
FIG. 3 shows a three-dimensional view of a mouse according to various embodiments.

FIG. 3 shows a three-dimensional view 300 of a mouse according to various embodiments. A left panel 312 of the mouse, a right panel 314 of the mouse, and a back panel 310 of the mouse may be connected to a single slider arm (which may be referred to as slider arm assembly or slider arm assy) which may be movable mounted on a fix (or fixed) shaft 308 which may be non-movably attached to a housing of the mouse. The slider arm assembly may include a left portion 304 coupled to the left panel 312, a right portion 306, coupled to the right panel 314, and a back portion 302, coupled to the back panel 310.

The attachment of the panels to the slider arm assembly may be removably detachable or may be fixed to the slider arm assembly. There may be an inner casing between the side panels and the slider arm assembly if they are removably attached. This may be for aesthetics, as if it would be removable, the user may be able to look into the internal circuitry of the mouse. The side panels may be removable thumb modules to cater for both left and right hand users, making it an ambidextrous mouse. The mouse according to various embodiments may provide a size change simultaneously in multiple areas within one adjustment variable or movement. Various embodiments may be provided using steps (for example with a movement with noticeable tactile latching at various position) or without steps (for example with a smooth movement without noticeable tactile latching at various position). According to various embodiments, there may be provided two (for example only two) sizes of the mouse: small and big to cater for desired use and purpose (such as for laptop and for desktop usage).

Figure 4:
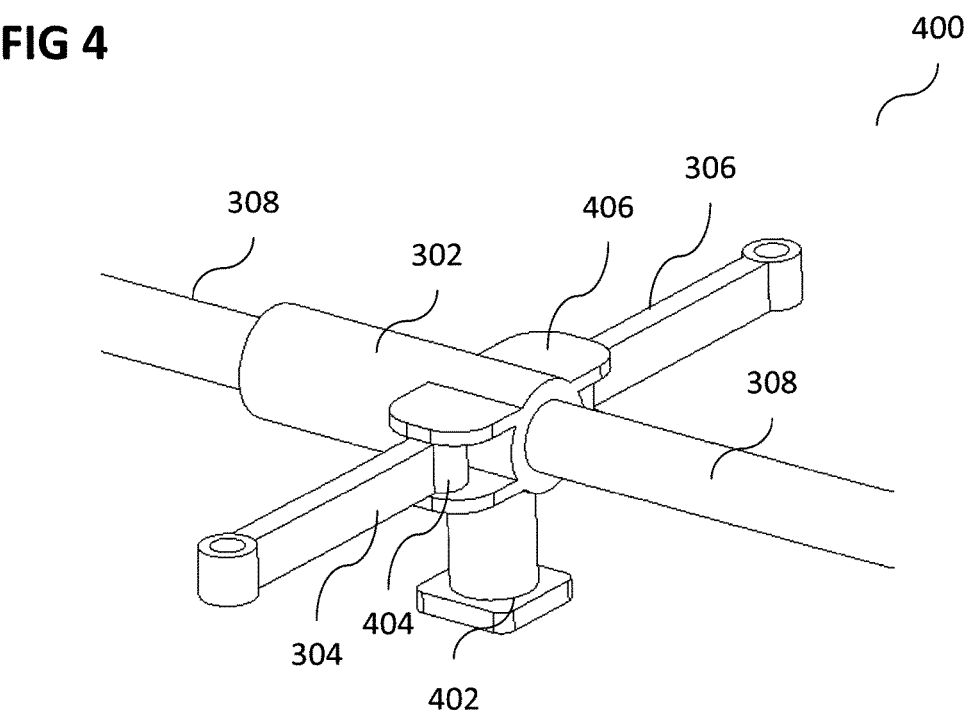
FIG. 4 shows an enlarged view of the slider arm according to various embodiments.

FIG. 4 shows an enlarged view 400 of the slider arm assembly (including the left portion 304, the right portion 306, and the back portion 302, moveably connected to the fix shaft 308) according to various embodiments. The left portion 304 may be coupled to the back portion 302 of the slider assembly by a first hinge 404. The right portion 306 may be coupled to the back portion 302 of the slider assembly by a second hinge 406. The slider arm assembly may be moveable along the fix shaft 308 by means of a slider actuator 402, which may be a manual slider actuator which may be accessible to a user from outside the housing of the mouse, or which may be electrically actuated.

Figure 5:
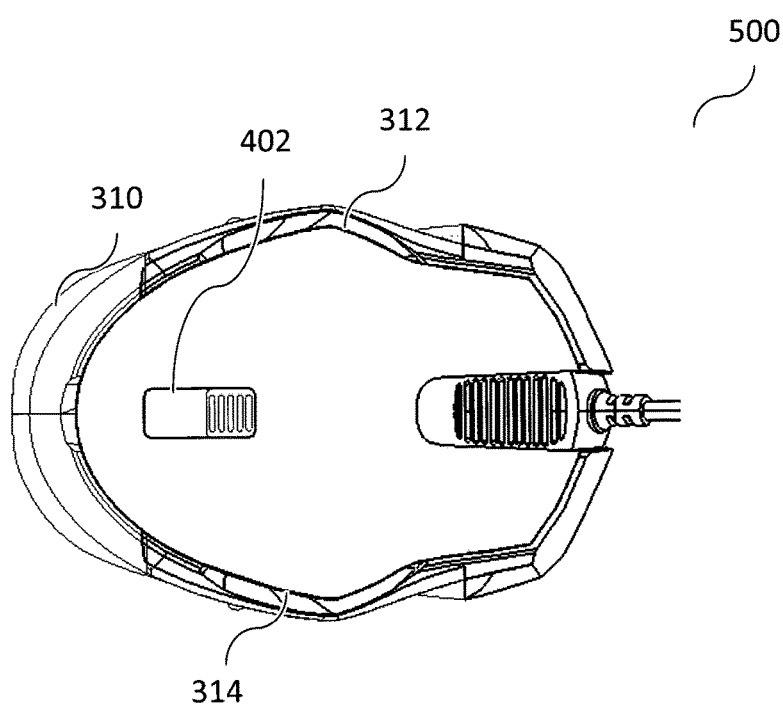
FIG. 5 shows a bottom view of a mouse according to various embodiments.

FIG. 5 shows a bottom view 500 of a mouse according to various embodiments, including the slider actuator 402.

Figure 6:
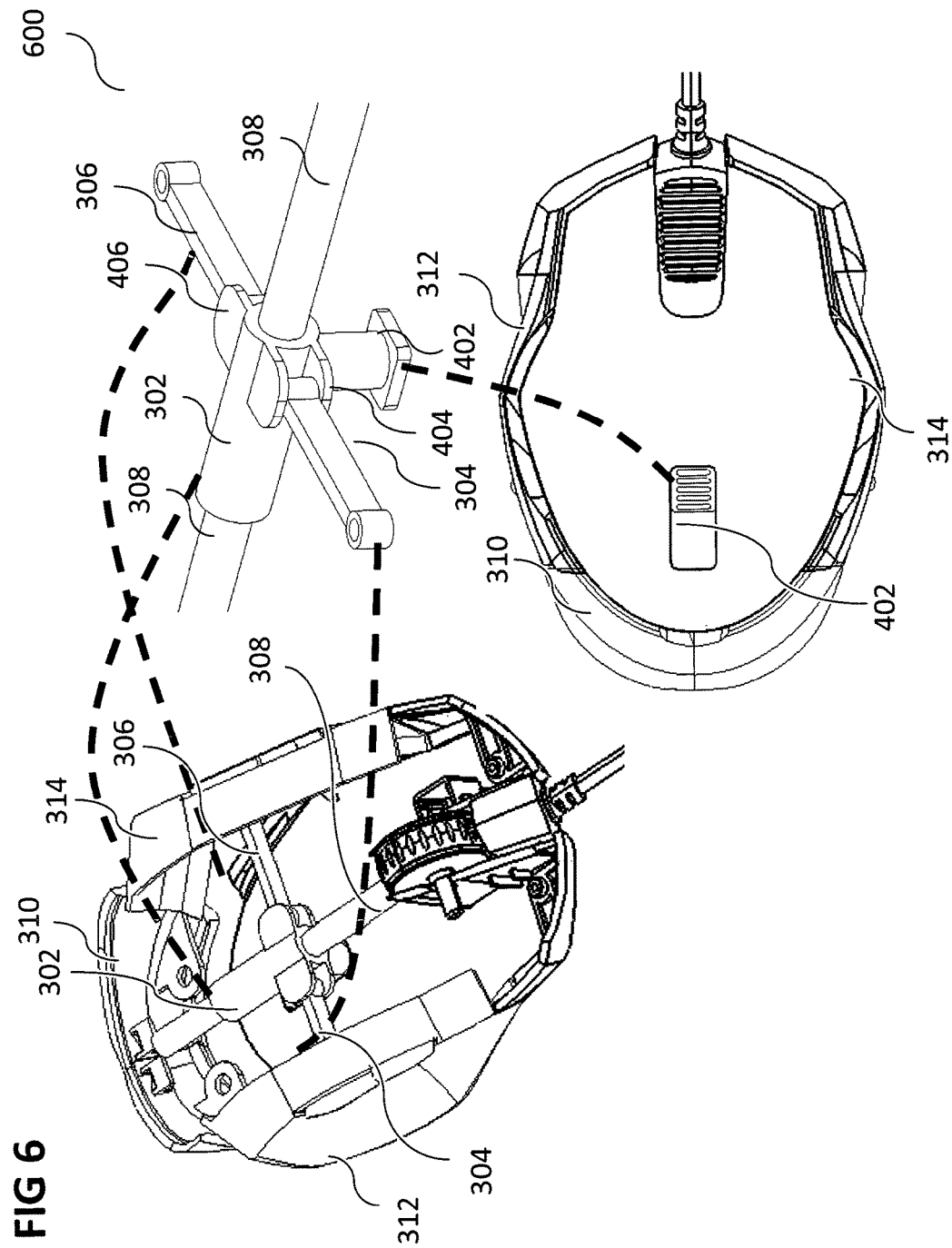
FIG. 6 shows a schematic view of the various views of FIG. 3, FIG. 4, and FIG. 5.

FIG. 6 shows a schematic view 600 of the various views of FIG. 3, FIG. 4, and FIG. 5, and, using dashed lines, indicates where the various identical components are shown in the various views.

The following examples pertain to further embodiments.

Example 1, is a mouse comprising: a housing comprising a plurality of panels; and a moveable member coupled to the plurality of panels such that a movement of the moveable member causes a movement of each panel of the plurality of panels.

In Example 2, the subject matter of Example 1 can optionally include a shaft fixedly attached to the housing; wherein the moveable member comprises a slider arm assembly comprising a central portion, the central portion slidably attached to the shaft; wherein the slider arm assembly is coupled to the plurality of panels such that a movement of the slider arm assembly along the shaft causes the movement of each panel of the plurality of panels.

In Example 3, the subject matter of any one of Examples 1 to 2 can optionally include that the movement of each panel of the plurality of panels comprises a simultaneous movement of the plurality of panels.

In Example 4, the subject matter of any one of Examples 1 to 3 can optionally include that the movement of each panel of the plurality of panels comprises a movement of the plurality of panels such that a width of the mouse and a length of the mouse are increased.

In Example 5, the subject matter of Example 4 can optionally include that the movement of each panel of the plurality of panels comprises a movement of the plurality of panels such that the width of the mouse and the length of the mouse are increased by the same absolute amount.

In Example 6, the subject matter of any one of Examples 4 to 5 can optionally include that the movement of each panel of the plurality of panels comprises a movement of the plurality of panels such that the width of the mouse and the length of the mouse are increased by the same relative amount.

In Example 7, the subject matter of Example 2 (alone or in combination with any other Example) can optionally include that the plurality of panels comprises a back panel; wherein the central portion engages with the back panel.

In Example 8, the subject matter of Example 2 (alone or in combination with any other Example) can optionally include that the plurality of panels comprises a left panel; wherein the slider arm assembly comprises a left portion pivotally connected to the central portion and connected to the left panel.

In Example 9, the subject matter of Example 2 (alone or in combination with any other Example) can optionally include that the plurality of panels comprises a right panel; wherein the slider arm assembly comprises a right portion pivotally connected to the central portion and connected to the right panel.

In Example 10, the subject matter of any one of Examples 1 to 9 can optionally include that each panel of the plurality of panels is connected to a main portion of the housing using a respective spring.

In Example 11, the subject matter of Example 10 can optionally include that the respective springs provide a counter force to forces exerted to the panels by the slider arm assembly.

In Example 12, the subject matter of Example 2 (alone or in combination with any other Example) can optionally include that the slider arm assembly further comprises an actuation member configured to move the slider arm assembly along the shaft.

In Example 13, the subject matter of Example 12 can optionally include that the actuation member is configured to be manually operated.

In Example 14, the subject matter of any one of Examples 12 to 13 can optionally include that the actuation member protrudes through the housing.

In Example 15, the subject matter of any one of Examples 12 to 14 can optionally include that the actuation member comprises an electrical actuator configured to move the slider arm assembly along the shaft.

In Example 16, the subject matter of Example 15 can optionally include that the electrical actuator comprises at one least actuator selected from a group of actuators consisting of a motor, a servo motor, a piezo actuator, an electromagnetic actuator, an electro-hydraulic actuator, and an electro-pneumatic actuator.

In Example 17, the subject matter of any one of Examples 15 to 16 can optionally include a control circuit configured to control the electrical actuator.

In Example 18, the subject matter of Example 17 can optionally include that the control circuit is configured to control the electrical actuator based on an input from a host computer.

In Example 19, the subject matter of any one of Examples 17 to 18 can optionally include that the control circuit is configured to control the electrical actuator based on a user input to the mouse.

In Example 20, the subject matter of any one of Examples 17 to 19 can optionally include that the control circuit is configured to control the electrical actuator to move the slider arm assembly to a pre-determined position when the mouse is powered off.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A mouse comprising:
a housing comprising a plurality of panels;
a shaft fixedly attached to the housing; and
a moveable member coupled to the plurality of panels such that a movement of the moveable member causes a movement of each panel of the plurality of panels,
wherein the moveable member comprises a slider arm assembly comprising a central portion, the central portion slidably attached to the shaft,
wherein the slider arm assembly is coupled to the plurality of panels such that a movement of the slider arm assembly along the shaft causes the movement of each panel of the plurality of panels.

2. The mouse of claim 1,
wherein the movement of each panel of the plurality of panels comprises a simultaneous movement of the plurality of panels.

3. The mouse of claim 1,
wherein the movement of each panel of the plurality of panels comprises a movement of the plurality of panels such that a width of the mouse and a length of the mouse are increased.

4. The mouse of claim 3,
wherein the movement of each panel of the plurality of panels comprises a movement of the plurality of panels such that the width of the mouse and the length of the mouse are increased by the same absolute amount.

5. The mouse of claim 3,
wherein the movement of each panel of the plurality of panels comprises a movement of the plurality of panels such that the width of the mouse and the length of the mouse are increased by the same relative amount.

6. The mouse of claim 1,
wherein the plurality of panels comprises a back panel;
wherein the central portion engages with the back panel.

7. The mouse of claim 1,
wherein the plurality of panels comprises a left panel;
wherein the slider arm assembly comprises a left portion pivotally connected to the central portion and connected to the left panel.

8. The mouse of claim 1,
wherein the plurality of panels comprises a right panel;
wherein the slider arm assembly comprises a right portion pivotally connected to the central portion and connected to the right panel.

9. The mouse of claim 1,
wherein each panel of the plurality of panels is connected to a main portion of the housing using a respective spring.

10. The mouse of claim 9,
wherein the respective springs provide a counter force to forces exerted to the panels by the slider arm assembly.

11. The mouse of claim 1,
wherein the slider arm assembly further comprises an actuation member configured to move the slider arm assembly along the shaft.

12. The mouse of claim 11,
wherein the actuation member is configured to be manually operated.

13. The mouse of claim 11,
wherein the actuation member protrudes through the housing.

14. The mouse of claim 11,
wherein the actuation member comprises an electrical actuator configured to move the slider arm assembly along the shaft.

15. The mouse of claim 14,
wherein the electrical actuator comprises at one least actuator selected from a group of actuators consisting of a motor, a servo motor, a piezo actuator, an electro-magnetic actuator, an electro-hydraulic actuator, and an electro-pneumatic actuator.

16. The mouse of claim 14, further comprising:
a control circuit configured to control the electrical actuator.

17. The mouse of claim 16,
wherein the control circuit is configured to control the electrical actuator based on an input from a host computer.

18. The mouse of claim 16,
wherein the control circuit is configured to control the electrical actuator based on a user input to the mouse.

19. The mouse of claim 16,
wherein the control circuit is configured to control the electrical actuator to move the slider arm assembly to a pre-determined position when the mouse is powered off.

* * * * *